United States Patent [19]
Iijima et al.

[11] 3,856,448
[45] Dec. 24, 1974

[54] MULTI-CORE CIRCULAR DIE FOR PREPARING MULTI-LAYER TUBULAR FILM

[75] Inventors: Akira Iijima; Yujiro Yokoyama, both of Yokohama; Yosuke Yamada, Tokyo; Makoto Kimura, Yokohama, all of Japan

[73] Assignees: Toyo Soda Manufacturing Co., Ltd., Shinanyo-shi; The Japan Steel Works, Limited, Tokyo, both of, Japan

[22] Filed: Dec. 29, 1972

[21] Appl. No.: 319,283

[30] Foreign Application Priority Data
Dec. 29, 1971 Japan.................................. 47-3069

[52] U.S. Cl............. 425/133.1, 425/381, 425/462
[51] Int. Cl............................................... B29f 3/00
[58] Field of Search .......... 425/133, 131, 463, 465, 425/464, 380, 460, 461, 462, 381, 378; 264/171, 173; 156/500

[56] References Cited
UNITED STATES PATENTS
| | | | |
|---|---|---|---|
| 2,978,748 | 4/1961 | McCauley et al............ | 156/500 UX |
| 3,419,938 | 1/1969 | Sonia et al.......................... | 425/133 |
| 3,754,847 | 8/1973 | Sawada et al................... | 156/500 X |

Primary Examiner—R. Spencer Annear
Assistant Examiner—Mark Rosenbaum
Attorney, Agent, or Firm—Oblon, Fisher, Spivak, McClelland & Maier

[57] ABSTRACT

A multi-core circular die for preparing multi-layer tubular film from thermoplastic resins which includes a plurality of cores having concentric tube portions and central spherical portions which are rotatably fitted with each other along the spherical portions. A plurality of tubular passages are provided for conducting the flow of the molten resins, the passages being formed within spaces formed between the tube portions of the cores, a housing surroundingly securing the cores together. Adjusting bolts are provided within the lower portions of the cores and housing so as to adjust the angles of the cores relative to the axis whereby the thickness of the passages, and consequently the film layers, may be altered so as to achieve film layers of uniform thickness.

11 Claims, 7 Drawing Figures

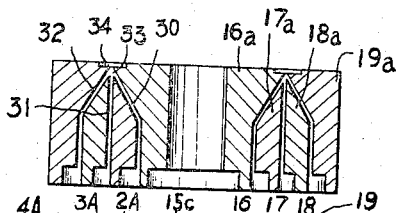
FIG. 2
FIG. 1
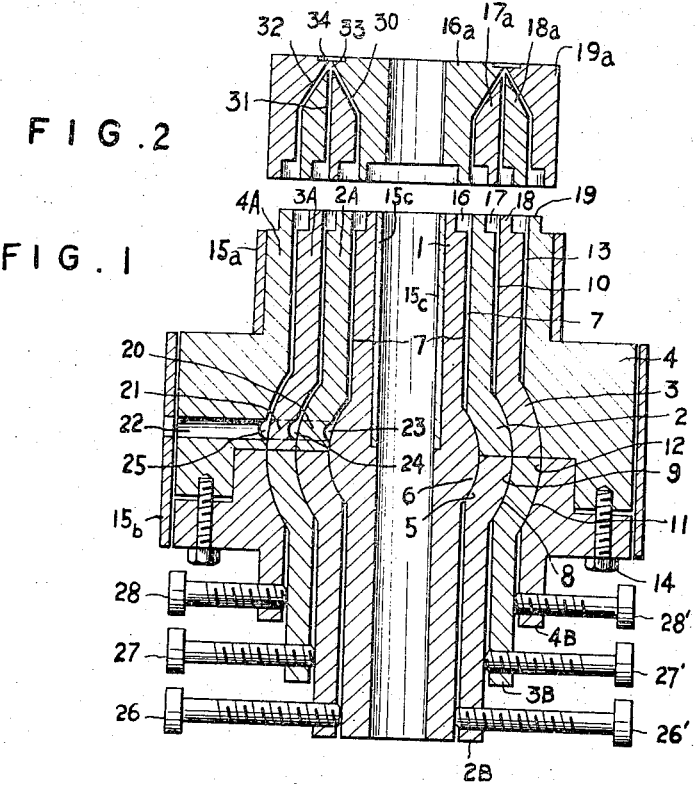
FIG. 3
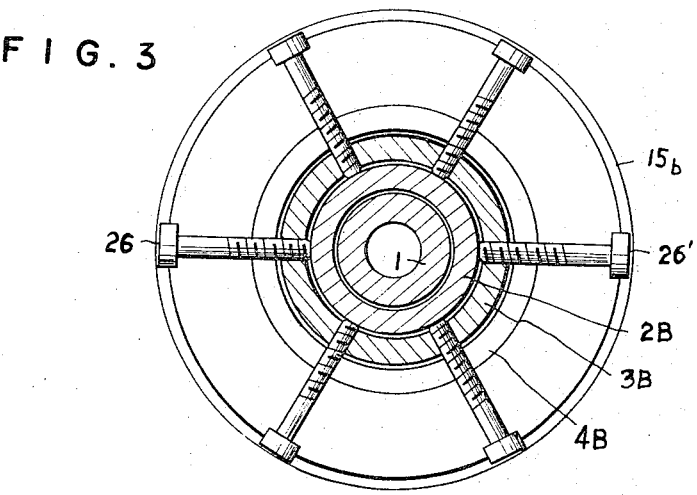

MULTI-CORE CIRCULAR DIE FOR PREPARING MULTI-LAYER TUBULAR FILM

BACKGROUND OF THE INVENTION

1. Field of the Invention:

This invention relates generally to dies and more particularly to a multi-core circular die for preparing a multi-layer tubular film made of a thermoplastic resin.

2. Description of the Prior Art:

Heretofore, conventional circular dies for preparing multi-layer tubular films have included a plurality of concentric tubes which are fixed relative to one another by means of a plurality of spacers, such as for example, spiders in a radial manner so as to form tubular passages therebetween. However, tubular films prepared by employing such conventional dies have had spider marks thereon because the flow of the molten resin has been interfered with by the spider structure.

In addition, while the thickness of the tubular films has been adjustable by means of eccentrically moving a ring provided within the die, the adjusting screws of the die have also directly contacted the molten resin so as to also interfere with the flow thereof, whereby additional marks have been developed upon the films.

Furthermore, it has been difficult to separately adjust the thickness of each layer of the resins of the multi-layer tubular film so as to attain a uniform and desired thickness for each layer. This operation moreover, is especially difficult when it is attempted to adjust the thickness of the intermediate layer in the instance of a multi-core die having three or more layers.

Still further, in the conventional multi-core die, the die has been externally heated. Accordingly, when two or more different resins having different melting points are utilized for the multi-layer tubular film, it has been difficult to attain a stable operation, whereupon such combination of resins could not in fact be employed for the preparation of the multi-layer tubular film.

SUMMARY OF THE INVENTION

Accordingly, it is an object of the present invention to provide a multi-core circular die which obviates the disadvantages noted heretofore.

Another object of the present invention is to provide a novel apparatus for preparing a multi-layer tubular film including sheet, horse, parison and pipe wherein each layer of the film has a low percentage deviation of uniform thickness.

Still another object of the present invention is to provide die apparatus wherein the resulting film is not marked or marred in any way.

A further object of the present invention is to provide die apparatus which enables various types of thermoplastic resins to be used for extruding a multi-layer tubular film therefrom.

The foregoing objectives are achieved according to this invention through the provision of a multi-core circular die for preparing a multilayer tubular film which comprises a plurality of cores having concentric tube portions and central spherical portions which are rotatably fitted with each other along the spherical portions. A plurality of tubular passages for conducting the flow of the molten resins are formed within spaces formed between the tube portions of the cores, and a housing surroundingly secures the cores together. In lieu of the spiders and the adjusting ring, a plurality of adjusting bolts are connected to the lower portions of the cores and the housing so as to adjust the angles of the cores relative to the die axis whereby the thickness of the tubular passages for the molten resins can be easily altered so as to assure uniform film layers.

BRIEF DESCRIPTION OF THE DRAWINGS

Various other objects, features and attendant advantages of this invention will be more fully appreciated as the same becomes better understood from the following detailed description when considered in connection with the accompanying drawings, in which like reference characters designate like or corresponding parts throughout the several views and wherein:

FIG. 1 is a schematic sectional view of a multi-core circular die constructed in accordance with this invention;

FIG. 2 is a schematic sectional view of a lip of the multi-core circular die of FIG. 1;

FIG. 3 is a schematic bottom view of the multi-core circular die of FIG. 1; and

DETAILED DESCRIPTION OF THE PREFERRED EMBODIMENTS

Figure 4A:
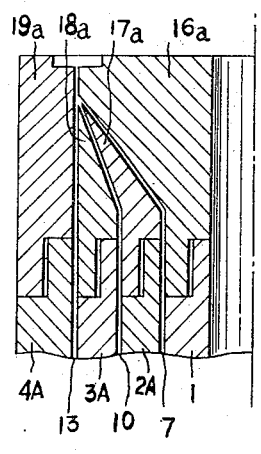
FIGS. 4A, B, C and D are, respectively, sectional views of various embodiments of lips which may be used in the multi-core circular die of FIG. 1.

Referring now to the drawings, and more particularly to FIG. 1 thereof, one embodiment of a multi-core circular die constructed according to this invention includes a substantially cylindrical inner core 1, a substantially cylindrical intermediate core 2 concentric with core 1, a substantially cylindrical outer core 3 concentric with cores 1 and 2, and a housing 4 which serves to secure the cores relative to one another. A spherical concave inner surface 6 formed within a central portion of the core 2 is rotatably fitted to and mated with a spherical convex outer surface 5 formed upon a central portion of the core 1 such that a cylinder space 7 is formed between core 1 and core 2 both above and below the mated portions 5 and 6, The intermediate core 2 is divided into an uper core 2A and a lower core 2B, the joint between the two sections being within a plane which bisects portion 6 of the core, the two core parts thus being engaged by means of a socket and spigot type joint, that is, the parts are slidable relative to one another.

In the same manner, a spherical convex outer surface 8 formed upon a central portion of intermediate core 2 is rotatably fitted within a spherical concave inner surface 9 formed within a central portion of outer core 3, such that another cylindrical space 10 is formed between cores 2 and 3 both above and below the fitted portions 8 and 9. The outer core 3 is also divided into an upper core 3A and a lower core 3B, the joint between the two sections being within a plane which bisects the spherical portion 9 of the core, the two core parts thus being engaged by means of a socket and spigot type joint. Furthermore, a spherical convex outer surface 11 formed upon a central portion of the outer core 3 is similarly rotatably fitted within a spherical concave inner surface 12 formed within a central portion of the housing 4, such that still another cylindrical space 13 is formed between core 3 and housing 4 both above and below the fitted portions 11 and 12. The housing 4 is also divided into an upper housing portion 4A and a lower housing portion 4B, the joint between the two sections being within a plane which bisects the spherical portion 12 of the housing, the two portions thus being engaged by means of a socket and spigot type joint. A plurality of bolts 14 extend through housing parts 4A and 4B whereby the housing portions 4A and 4B are secured together and the cores 1, 2 and 3 are respectively rotatably secured within the housing 4.

The upper end of each of the cores as well as the housing can respectively be fixed with rings 16, 17, 18 and 19 when a plurality of coextruded films are to be adhered together at a point external of the die, the rings being respectively mounted by means of screws, not shown. In addition, the housing 4 has three passages 20, 21 and 22 for feeding the molten resin to be extruded, wherein the passages extend radially through upper housing portion 4A to the upper intermediate core 2A, the upper outer core 3A, and the upper housing portion 4A respectively. The passages are not connected with each other but are respectively connected to one of three manifolds 23, 24 and 25 formed within the upper intermediate core 2A, the upper outer core 3A, and the upper housing portion 4A, respectively. A pair of tubular heaters 15a and 15b are provided upon the outer surfaces of the housing 4 while another tubular heater 15c is provided within the inner surface of the inner core 1, for controlling the temperatures of the various resins. The heaters can be removed when they are not required depending upon the resins used.

The operation of the above-described embodiment of the apparatus constructed according to this invention will now be set forth. A molten resin for forming an inner layer of the composite tubular film is supplied from the passageway 20 to the manifold 23 and is extruded from the orifice of cylindrical space 7 as tubular film. In this case, a uniform thickness of the tubular film is attained by adjusting a plurality of threaded adjusting bolts 26 which are equidistantly mounted within the lower intermediate core 2B and about the inner core 1, the adjustment being conveniently accomplished by rotating core 2 about core 1 upon surface 5. Similarly, another molten resin for forming an intermediate layer of the composite tubular film is supplied from the passageway 21 to the manifold 24 and is extruded from the orifice of the cylindrical space 10 as tubular film. In this operation, a uniform thickness of such tubular film is attained by adjusting a plurality of threaded adjusting bolts 27 which are equidistantly mounted within the lower outer core 3B and about the core 2, the adjustment being conveniently accomplished by rotating the outer core 3 about the middle core 2 upon the spherical surface 8.

In the same manner, still another molten resin for forming an outer layer of the composite tubular film is supplied from the passageway 22 to the manifold 25 and is extruded from the orifice of the cylindrical space 13 as tubular film. In this instance, a uniform thickness of such tubular film is attained by adjusting a plurality of threaded adjusting bolts 28 which are equidistantly mounted within the lower housing 4B and about the lower core 3B, the adjustment being easily accomplished by rotating the housing 4 about the outer core 3 upon the spherical surface 11. As stated hereinbefore, the inner layer film, the intermediate layer film, and the outer layer film are simultaneously extruded through the respective orifices of the die and adhere to each other externally of the die so as to form a three layer tubular film.

Referring now to FIG. 2, there is disclosed one embodiment of a lip which may be used within the die of the present invention for preparing a three layer tubular film whereby the three layers adhere to one another within the lip. In this die, in lieu of the rings 16, 17, 18 and 19 being mounted adjacent the orifice as shown in FIG. 1, a lip is provided which has the rings 16a, 17a, 18a and 19a whereby the resins will adhere to each other within the lip. Hence, the three tubular films are extruded from the orifices of the cylindrical spaces 7, 10 and 13 through converging branch passages 30, 31 and 32 to a common land area 33, whereby a three layer composite tubular film is extruded from the orifice 34 which is provided adjacent to the land area 33.

Although the embodiment of this invention as illustrated is for the preparation of three layer tubular film, the invention is not so limited, but to the contrary, it is possible to apply the principles to apparatus for preparing multi-layer tubular film having a number of layers in excess of three.

In addition, as stated heretofore, the invention includes a plurality of cores having spherical portions which are eccentrically assembled within the housing, and each core may be turned to a desirable angle relative to the central spherical part by rotating each core upon its own spherical part by means of the adjusting bolts so as to easily adjust the concentricity of the core forming the cylindrical passage, and moreover, it is possible to obtain a multi-layer tubular film of uniform thickness because there is no structural component to interfere with the flow pattern of any of the molten resins comprising any one of the film's layers.

Figure 4B:
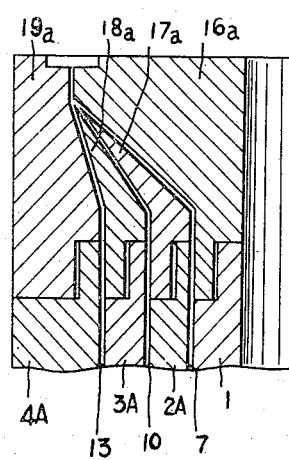
Figure 4C:
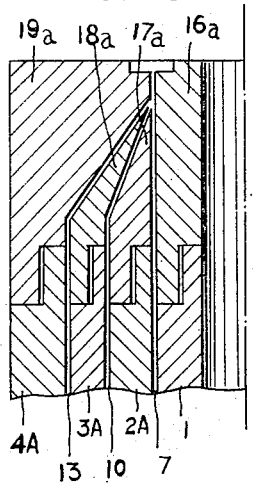
Figure 4D:
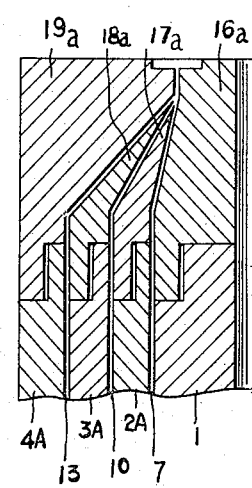

Referring now to FIGS. 4A, B, C and D, there are disclosed several embodiments of lips which may be utilized within the multi-layer circular die of FIG. 1. Each annular part of the lip can be engaged with the upper portion of each core so as to form the branch passages and the land area with a socket and spigot joint therebetween. As is apparent from the figures, the branch passages within the lip can take various forms. For example, as seen in FIG. 4A, an outer branch passage extending from cylindrical space 13 may be formed in a direction parallel to the die axis, which the inner branch passages extending from cylindrical spaces 10 and 7 are formed so as to be partially parallel to the die axis and partially divergent from the die axis, all of the branch passages being joined at the land area so as to form the outlet for the composite multi-layer tubular film. Similarly, all of the branch passages can be formed so that they partially diverge from the die axis, as seen in FIG. 4B or in the alternative they may all partially converge toward the axis as seen in FIG. 4D. It is also possible of course that the inner branch passage extending from cylindrical space 7 be formed so as to be parallel to the die axis while the outer branch passages extending from cylindrical spaces 10 and 13 are formed so as to be partially parallel to the die axis and partially converged toward the axis. The spaces between the branch passages of the lip may be adjusted by rotation of the spherical portions of the cores, which as hereinbefore indicated are eccentrically disposed, such that upon rotation, the upper portions of the cores may push or urge the lower extensions of the rings outwardly, thereby changing the space between the rings and accordingly the size or thickness of the film being extruded therebetween the cylindrical spaces of the branch passages within the lip being selected depending upon the desirable thickness of each film layer.

A ratio of the thickness of the inner, intermediate, and outer layers of the film can thus be controlled depending upon the ratio of the cylindrical spaces as well as the ratio of the supply of the resins. The resins used for preparing the multi-layer film can be of various types of thermoplastic resins, such as for example, polyolefin e.g., polyethylene, polypropylene; polyester e.g. polyethyleneterephthalate; nylon; polyacrylate; polyvinyl resins, e.g. polyvinyl chloride; polystyrene; and polyurethane, and the like, and copolymers thereof, e.g. poly-ethylenevenylacetate; Ionomer. It is especially preferable to use an adhesive resin as the intermediate layer. A ratio of the thickness of each layer to that of the composite multi-layer tubular film may be within the range of 5% to 95% which of course depends upon the cylindrical spaces which may of course be adjusted. The size of the multi-layer circular die according to this invention can be 1 cm. to 100 cm. or more, and it is selected depending upon the desirable products of tubular film.

It is often preferable to employ an interior mandrel which is placed above the central portion of the die so that at least a portion of the mandrel is disposed within the inner cylindrical core 1, or in the region of extrusion, to prevent any radially inward movement of the core due to the extrusion force so that higher productivity can be obtained and a film of stable diameter provided which also exhibits excellent physical properties. When the layers are adhered externally of the die, and an interior mandrel is employed, high adhesiveness can be obtained.

In accordance with this invention, it is thus possible to obtain a multi-layer tubular film, each layer of which has a uniform thickness which is attained by properly positioning a plurality of adjusting bolts since the relative position of each core and the housing may then be accurately adjusted by rotating the centrally located spherical parts of the cores and the housing. Within the areas of the spherical portions, the cores and the housing are rotatably fitted without any intervening space. Furthermore, the relative position of the annular parts of the die lip can be adjusted by corresponding the same to the adjustment of the cylindrical spaces within the die proper.

Several examples of the preparation of multi-layer tubular films by employing the multi-core circular die and lip of the present invention are illustrated hereinbelow.

EXAMPLE 1

An inner core 1 having an outer diameter of 95 mm, an intermediate core 2A having an outer diameter of 135 mm, and an outer core 3A having an outer diameter of 175 mm were assembled within a housing 4A, the spherical parts of the cores and housings fitting each other without any intervening space therebetween.

The length of the cylindrical spaces 7, 10 and 13 were, respectively 130 mm, 115 mm, and 100 mm. The diameters of the spherical portions were 140 mm, 190 mm, and 240 mm, for the inner core, the intermediate core, and the outer core, respectively.

A lip having annular portions similar to those shown in FIG. 4B was engaged at the upper portions of the cores so as to form branch passages and a land area therewith. The uniform thicknesses of the branch passages were attained by adjusting the various bolts.

Molten low density polyethylene was supplied to the inner cylindrical space, while a molten ethylene vinyl acetate copolymer was supplied to the intermediate cylindrical space and molten high density polyethylene was supplied to the outer cylindrical space at the ratio of 1:0.25: 1.25 so as to extrude a multi-layer tubular film having a thickness of 0.15 mm wherein there was less than 6 percent deviation of thickness within each layer. Furthermore, no spider marks were found nor was the film marred.

EXAMPLE 2

This example was similar to that of Example 1 except that the lip employed was that one shown in FIG. 2, whereupon a multi-layer tubular film having a thickness of 0.06 mm was prepared by using low density polyethylene as the inner layer, Ionomer as the intermediate layer, and nylon-6 as the outer layer, the ratio thereof being 3:1:2. The temperature of the outer layer of the die was 260°C while the temperature of the inner layer of the die was 180°C. The film had less than 5 percent deviation of thickness within each layer.

Obviously, many modifications and variations of the present invention are possible in light of the above teachings. It is therefore to be understood, within the scope of the appended claims, the present invention may be practiced otherwise than as specifically described herein.

What is claimed as new and desired to be secured by letters patent of the United States is:

1. Apparatus for preparing a multi-layer tubular film made of a thermoplastic resin comprising a multi-core circular die which in turn comprises:
   a plurality of cores having concentric tube portions and central spherical portions which are rotatably fitted with each other at said central spherical portions;
   a housing surrounding said cores and having a spherical inner surface which rotatably secures said cores together; and
   a plurality of tubular passages for conducting the flow of said resin which are disposed within spaces formed between said tube portions of said cores and between said tube portions of one of said cores and said housing.

2. The apparatus as set forth in claim 1, which further comprises a lip having a plurality of branch passages which are respectively connected to each of said tubular passages of said multi-layer circular die, wherein molten resins supplied to said branch passages are co-extruded.

3. The apparatus as set forth in claim 1 which further comprises a mandrel at least partially disposed within the inner most one of said plurality of cores above said multi-layer circular die.

4. The apparatus as set forth in claim 1, wherein a plurality of adjusting screws are connected to the lower portions of said housing and said cores, whereby the angle of each core relative to the die axis may be adjusted so as to provide said tubular passages of uniform thickness.

5. The apparatus as set forth in claim 1, wherein heating means are disposed upon an outer surface of said housing and upon an inner surface of one of said cores so as to control the temperature of each of the molten resins.

6. The apparatus as set forth in claim 2, wherein said branch passages are disposed between tubular portions of said lip, each tubular portion of said lip being engaged to a corresponding head portion of said cores and said housing of said multi-layer circular die.

7. The apparatus as set forth in claim 2, wherein an outer branch passage is formed in a direction parallel to the die axis while the other inner branch passages are formed in a direction which diverges from said axis and wherein further, all of said branch passages are joined at an outlet position.

8. The apparatus as set forth in claim 2, wherein all of said branch passages are formed in a direction which diverges from the die axis and are joined at an outlet position.

9. The apparatus as set forth in claim 2, wherein an inner branch passage is formed in a direction parallel to the die axis while the other outer branch passages are formed in a direction which converges toward said axis, and wherein further, all of said branch passages are joined at an outlet position.

10. The apparatus as set forth in claim 2, wherein all of said branch passages are formed in a direction which converges toward the die axis are joined at an outlet position.

11. The apparatus as set forth in claim 2, wherein said spherical portions of said cores are eccentrically assembled within said housing, said lip comprises a plurality of substantially concentric rings forming said branch passages therebetween and the thickness of each of said branch passages of said lip is adjustable by means of rotating said cores relative to each other about said spherical portions.

* * * * *